United States Patent [19]

Beall et al.

[11] Patent Number: 4,814,297

[45] Date of Patent: Mar. 21, 1989

[54] STRENGTHENED GLASS ARTICLE AND METHOD

[75] Inventors: George H. Beall, Big Flats; Joseph E. Pierson; Stanley D. Stookey, Both of Painted Post, all of N.Y.

[73] Assignee: Corning Glass Works, Corning, N.Y.

[21] Appl. No.: 32,613

[22] Filed: Apr. 1, 1987

[51] Int. Cl.$^4$ .................. C03C 10/12; C03C 10/04; C03C 14/00

[52] U.S. Cl. .............................. 501/7; 501/4; 501/5; 501/32; 501/68; 501/69

[58] Field of Search .................. 501/4, 5, 7, 32, 68, 501/69

[56] References Cited

U.S. PATENT DOCUMENTS

| | | | |
|---|---|---|---|
| 2,998,675 | 9/1961 | Olcott et al. | 501/7 |
| 3,006,775 | 10/1961 | Chen | 501/5 |
| 3,253,975 | 5/1966 | Olcott et al. | 501/153 |
| 3,779,856 | 12/1973 | Pirovz | 501/7 |
| 3,938,978 | 2/1976 | Hummel | 501/7 |
| 4,022,627 | 5/1977 | Tashiro et al. | 501/6 |
| 4,057,434 | 11/1977 | Rittler | 501/7 |

Primary Examiner—Mark L. Bell
Attorney, Agent, or Firm—Clinton S. Janes, Jr.

[57] ABSTRACT

There is disclosed a lithium aluminosilicate glass body encased within, and integral with, a thin, compressive, semicrystalline layer containing beta-eucryptite and/or beta-quartz solid solution crystals, and a method of producing such body. The layer has a substantially lower thermal coefficient of expansion than the glass, but has the same chemical composition as the glass. That composition, in percent by weight on a calculated oxide basis is 55–67% $SiO_2$, 5.0–7.5% $Li_2O$, 22–28% $Al_2O_3$, 0–2% $Na_2O$ and 0–10% ZnO, the molar ratio of $R_2O+RO$ to $Al_2O_3$ being greater than one. Controlled crystallization procedure is described whereby the crystallized layer can be produced in a relatively short time.

8 Claims, 1 Drawing Sheet

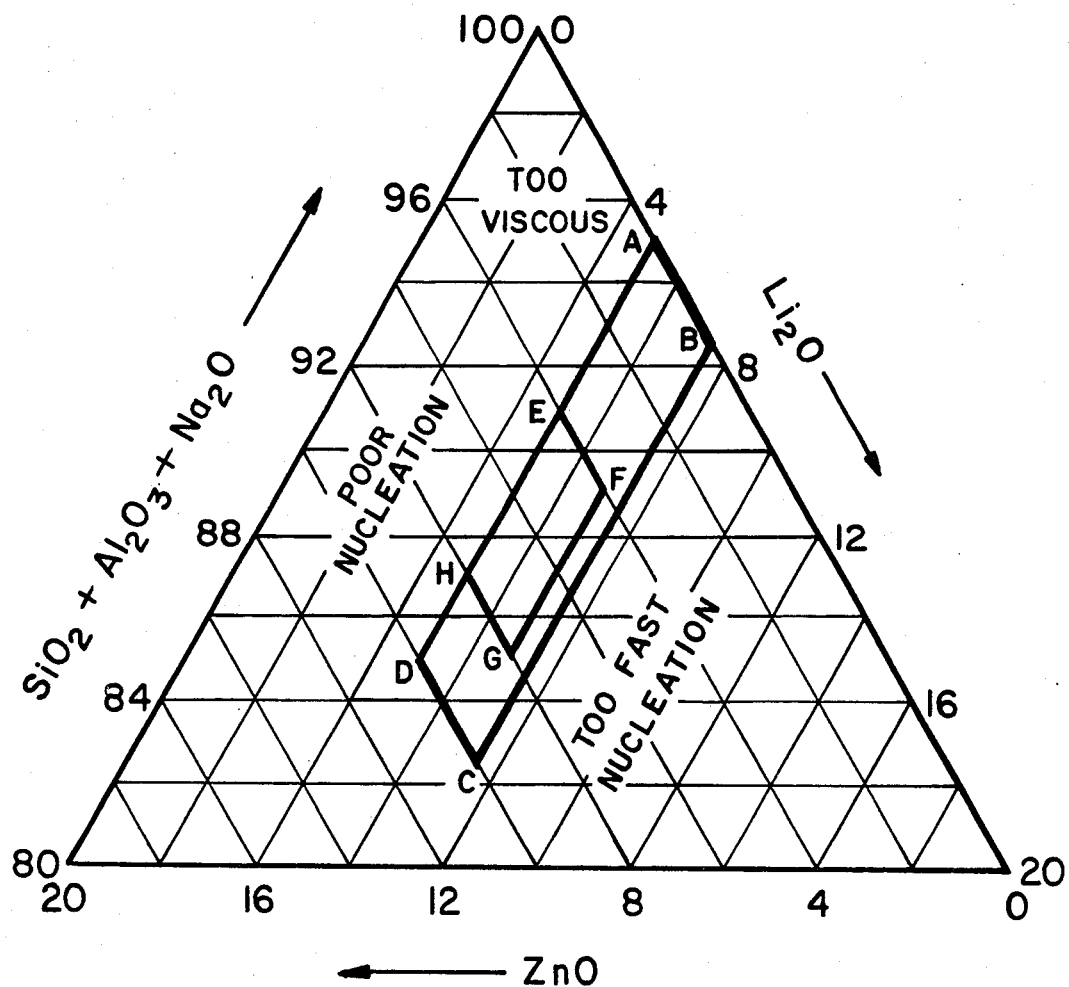

STRENGTHENED GLASS ARTICLE AND METHOD

This invention relates to a lithium aluminosilicate glass body that is rendered mechanically strong by being encased within a thin, compressive, semicrystalline, layer containing beta-eucryptite and/or beta-quartz solid solution crystals. The semicrystalline layer is integral with, and has the same oxide composition as, the glass. The invention further contemplates a method of making such encased glass body.

The mechanical strength of a glass body may be increased by providing the body with a compressive stress in, and parallel with, its surface. One method of accomplishing this, without altering the oxide composition of the glass, is a process known as thermal tempering. This comprises heating the glass body, while avoiding devitrification thereof, and then rapidly cooling it. The maximum mechanical strength, or modulus of rupture, of an abraded, tempered glass article of the type used for culinary purposes does not normally exceed 12,000–16,000 p.s.i. A comparable abraded, annealed glass article has a modulus of approximately 6,000–8,000 p.s.i.

A higher compressive stress may be produced in the surface of a glass body by ionic migration into the surface in exchange for ions of the glass. The surface layer of the glass body thereby acquires a different chemical composition and a compressive stress in its surface layer. This procedure is commonly referred to as chemical or ion exchange strengthening.

In one form, large alkali metal ions migrate from a molten salt bath into a glass in exchange for smaller lithium ions from the glass. This was first described by S. S. Kistler in "Stresses in Glass Produced by Nonuniform Exchange of Monovalent Ions", *Journal of American Ceramic Society*, 45, No. 2, pp 59–68, February, 1962. Relatively long ion exchange times, for example 16–24 hours, have seriously limited use of this method.

Another form of chemical strengthening is disclosed in U.S. Pat. No. 2,779,136 (Hood et al.). The procedure involves the replacement of large sodium or potassium ions by smaller lithium ions at a temperature above the glass strain point. This creates a glass of lower coefficient of thermal expansion. If the glass contains suitable proportions of alumina and silica, such method may also result in the formation of beta-spodumene crystals (classic formula $Li_2O \cdot Al_2O_3 \cdot 4SiO_2$) in the glass surface. This further lowers the expansion coefficient and increases the surface compressive stress. Such method requires the immersion of the glass body in a bath containing a molten lithium salt heated above the strain point of the glass.

Recent improvements in the procedure of the Hood et al. patent are described in pending U.S. application Ser. No. 743,047, filed June 10, 1985 in the names of Joseph E. Pierson and Stanley D. Stookey under the title STRENGTHENED GLASS ARTICLES AND METHOD FOR MAKING, now U.S. Pat. No. 4,726,981. However, the hazards involved in handling molten salt baths still remain. Hence, the development of a procedure not requiring such baths would be highly desirable.

An alternative procedure is disclosed in earlier U.S. Pat. Nos. 2,998,675 (Olcott et al.) and No. 3,253,975 (Olcott et al.). However, the teaching of these patents has not been commercially exploited, presumably because treatment times were impractically long.

U.S. Pat. No. 2,998,675 (Olcott et al.) relates to a glass body having a thin, compressive, semicrystalline layer of the same oxide composition as the glass, and to a method of crystallizing such layer on the glass body. The method comprises heat treating a glass body comprising in parts by weight, 65–72 $SiO_2$, at least 4 parts $Li_2O$, 22.5–30 parts $Al_2O_3$, the weight ratio of $Li_2O$ to $Al_2O_3$ being no greater than 0.3 to 1, and at least one crystallization catalyst selected from 0.1–3.5 $TiO_2$, 0.1–5 $B_2O_3$, 0.4–2 $Na_2O$ and 0.5–10 $PbO$.

U.S. Pat. No. 3,253,975 (Olcott et al.) likewise relates to producing a thin, compressive, semicrystalline layer on a glass body, but employs a glass comprising, in parts by weight, 52–65 $SiO_2$, at least 4 $Li_2O$, not over 40 $Al_2O_3$, with the weight ratio of $Li_2O$ to $Al_2O_3$ again being no greater than 0.3 to 1. Other compatible oxides are permitted in limited amounts, but none is required.

Each patent prescribes a crystallizing heat treatment ranging in duration from one hour at an upper temperature equivalent to a glass viscosity of $10^7$ poise, to 40 hours at a lower temperature where the glass viscosity is $10^{10}$ poises. These temperatures are indicated as ranging from a high around 870° C. to a low at 750° C. or below. As the examples indicate, and as experience verified, times on the order of 6 to 16 hours were generally required. Further, when low temperatures were used to avoid haze from crystals growing too large, much longer times were required.

To render the glass strengthening technique of these patents commercially practical, the time required to produce crystallization must be dramatically reduced. Also, many applications require freedom from haze and/or color. To avoid haze, one must control the crystal phase that develops; also, the presence of numerous small crystals is the preferred condition. To avoid color, one must avoid using certain nucleating agents such as $TiO_2$.

PURPOSES OF THE INVENTION

A basic purpose is provide a mechanically strong glass body having, as an integral part of the glass body, a thin, compressive, semicrystalline, surface layer with the same oxide composition as the glass.

Another purpose is to produce glass articles that are light weight, yet resistant to breakage.

A further purpose is to provide such glass articles that are transparent and essentially free of haze and/or color.

Another purpose is to provide a simple cost-effective method of producing such articles that can be rendered commercially practical.

A further purpose is to provide a method that requires relatively short periods of heat treatment to produce a compressive, semicrystalline layer on a glass body.

A still further purpose is to provide a method that does not require a molten salt bath or other special heat treating procedure and/or equipment.

Another purpose is to provide improvements in the strengthening procedure described in the Olcott et al. patents noted above.

A specific purpose is to dramatically shorten the heat treating time required to develop strengthening by the Olcott et al. methods.

PRIOR PATENT LITERATURE

Reference is made to the earlier discussion of the Olcott-Stookey patents to avoid repetition. The United States patents hereafter mentioned generally discuss the roles played by zinc oxide (ZnO) in the production of various glass-ceramics.

U.S. Pat. No. 3,006,775 (Chen) discloses producing a family of $Li_2O$-$Al_2O_3$-$SiO_2$ glass-ceramics. The patent teaches that "it is unnecessary to incorporate a nucleating agent", but up to 15% of a "fluxing agent" is highly desirable. A fluxing agent is defined as a modifier that can improve properties of the glass or product; alkali metal oxides, fluorides, and divalent oxides (including ZnO) are listed. No distinctive function is ascribed to zinc oxide, and no specific example shows its use.

Numerous subsequent patents list compositions containing a minor amount of ZnO, but fail to identify a particular purpose or function. However, U.S. Pat. No. 4,057,434 shows ZnO as the sole modifier in a glass-ceramic for infra-red transmission.

U.S. Pat. No. 3,694,434 shows ZnO as the sole modifier in a glass-ceramic for infra-red transmission.

U.S. Pat. No. 3,694,360 (Weaver) discloses a family of ferrimagnetic glass-ceramics composed essentially of $Fe_2O_3$, $Li_2O$ and $SiO_2$. The patent teaches that "(m)odifiers or nucleants, such as ZnO, can be added to the composition to enhance the degree of crystallization and magnetic properties of the lithium ferrite".

U.S. Pat. No. 3,938,978 (Hummel) discloses that $Li_2O$-$Al_2O_3$-$SiO_2$ glass-ceramics containing 1-4% ZnO tend to microcrack due to volatilization of the ZnO. The patent corrects this by adding a cesium, rubidium, or potassium salt.

U.S. Pat. No. 4,022,627 (Tashiro et al.) discloses nepheline glass-ceramics composed of $Na_2O$, $Al_2O_3$ and $SiO_2$ and containing a combination of 1-10% ZnO, 0.5-5.0% $ZrO_2$ and 0-3% $TiO_2$ as nucleating agent.

SUMMARY OF THE INVENTION

The article of our invention is a lithium aluminosilicate glass body that is rendered mechanically strong by being encased within a thin, compressive, semicrystalline layer containing beta-eucryptite and/or beta-quartz solid solution crystals, the semicrystalline layer being integral with, and having the same oxide composition as, the glass, that composition consisting essentially in percent by weight, as calculated from the batch on an oxide basis, of 55-67% $SiO_2$, 5-7.5% $Li_2O$, 22-28% $Al_2O_3$, 0-2% $Na_2O$, and 0-10% ZnO, the molar ratio of $R_2O+RO$ to $Al_2O_3$ being greater than one. Optimum results are achieved within a narrower composition range of 60-66% $SiO_2$, 22-25% $Al_2O_3$, 5-7% $Li_2O$, 4-8% ZnO, 0-2% $Na_2O$, the molar ratio of $R_2O+RO$ to $Al_2O_3$ being greater than 1.2.

The invention further comprehends a method of producing such articles which comprises formulating a glass batch consisting essentially, as calculated on an oxide basis in percent by weight, of 55-67% $SiO_2$, 5-7.5% $Li_2O$, 22-28% $Al_2O_3$, 0-2% $Na_2O$, and 0-10% ZnO, the molar ratio of total $R_2O+RO$ to $Al_2O_3$ being greater than one, mixing and melting such batch and forming a glass body therefrom, subjecting the glass body to a temperature in the nucleating range of 650°-850° C. for a time sufficient to develop nuclei in a thin layer on the surface of the body only, and thereafter further heating the surface nucleated glass body in the range of 650°-850° C. for a time up to two hours to grow beta-eucryptite and/or beta-quartz solid solution crystals on said nuclei. Preferably, the nucleation is achieved by cooling the formed glass body through the nucleating range at a rate sufficiently slow to permit nucleation, but rapidly enough to avoid crystal growth.

BRIEF DESCRIPTION OF THE DRAWING

The appended drawing comprises a triaxial composition diagram illustrating the glass compositions operable in the present invention.

GENERAL DESCRIPTION

It is well known that beta-eucryptite (classic formula $Li_2O\ Al_2O_3 2SiO_2$) forms an incomplete solid solution with the hexagonal silica polymorph beta-quartz. The solid solution region runs from a $Li_2O:Al_2O_3:SiO_2$ molar ratio of 1:1:2 to 1:1:10. Crystals in which the silica content is greater than a ratio of about 1:1:3 are metastable with respect to the tetragonal phase beta-spodumene. In the description that follows, "beta-quartz solid solution" will refer to beta-eucryptite crystals in solid solution with beta-quartz.

As noted earlier, the Olcott-Stookey patents disclose an article having a thin, compressive, semicrystalline layer containing a multiplicity of microscopic and sub-microscopic crystals. This surface layer has a linear thermal expansion coefficient substantially lower than that of the uncrystallized glass which it encases.

Characteristically, crystallization occurs only in a surface layer of the glass article while leaving the interior thereof substantially unchanged. The preferential surface nucleation differentiates products of this invention from glass-ceramics where crystallization occurs throughout the entire body. The resulting article as a whole may be substantially transparent. Both the thinness of the semicrystalline layer (less than about 0.15 mm) and the relative similarity of the refractive indices of the crystals and the glass contribute to transparency.

The linear expansion coefficient of the semicrystalline layer is substantially lower than that of the glass interior. The crystalline beta-eucryptite and/or beta-quartz solid solution which is formed has an expansion coefficient in the neighborhood of zero, and may even be negative in value. Moreover, the expansion coefficient of the residual glassy matrix surrounding such crystals is also relatively lower than that of the unchanged glass of the interior. The formation of the crystals leaves the matrix with a lower available content of $Li_2O$ per se. This has a strong effect on thermal expansion coefficient. The lower expansion coefficient of the semicrystalline surface layer, relative to that of the interior of the glass, establishes a uniform compressive stress in and parallel to the surface after the article is cool, whereby the modulus of rupture (MOR) of the article is substantially increased.

Our invention modifies the compositions of the Olcott-Stookey glasses in such manner as to greatly accelerate the rate of surface nucleation and development of surface crystallization. It also provides glassware having improved physical characteristics. The composition of our improved glass article is selected from a family that is closely related to, but has distinct differences from, the glass compositions disclosed in the -975 Olcott et al. patent. In particular, the present lithia and alumina levels are significantly lower than those previously disclosed. The molar relationships of certain oxides and oxide groups also differ, and the RO constituent, viz., the divalent metal oxide constituent, of our glasses, if present, comprises a substantial amount of ZnO.

Our studies indicate that rapid nucleation in the glass surface is favored by the lower Li$_2$O and Al$_2$O$_3$ contents that characterize our glasses. Thus, the lower Li$_2$O and Al$_2$O$_3$ values tend to produce more numerous, and hence finer-dimensioned, crystals. This results in a transparent product that avoids the haziness associated with larger crystals in the earlier Olcott et al. glasses.

Comparative tests indicate that glasses, prepared and heat treated as prescribed by the -975 patent, have relatively few crystals, but that these crystals grow as large as several hundred microns in size. In constrast, the present transparent glasses have more numerous nuclei and smaller crystals grown thereon. These crystals are normally less than a hundred microns, and usually not over about 50 microns, in size.

Lithia (Li$_2$O) is necessary, of course, for crystal formation. It is also known to have a strong fluxing action, thus facilitating glass melting. As just explained, a controlled Li$_2$O level favors formation of small crystals, a major factor in transparency of the product. At least 5% Li$_2$O should therefore be present. However, the content should not exceed from 7.5% in the interest of maintaining fine grain size. We prefer a content of about 5.0 to 7.0%.

An Al$_2$O$_3$ content of at least 22% is required for crystal formation. With large Al$_2$O$_3$ contents, however, the nucleation rate slows and the crystals grow larger. Therefore, the Al$_2$O$_3$ content should not exceed about 28%, and we prefer a value in the range of 22-25% for consistent transparency and optimum strength.

We have also observed two molecular ratios that characterize our present compositions. First, the mole ratio of SiO$_2$/Al$_2$O$_3$ should range about 4:1. We do not offer any scientific explanation for the operability of this range, but believe it may relate to a favorable viscosity for the crystallization process. The second relation involves the mole ratio of R$_2$O+RO to Al$_2$O$_3$. (R$_2$O refers to the alkali metal oxides.) This value should be greater than one, and preferably greater than 1.2. The Li$_2$O molar value usually is less than the Al$_2$O$_3$, thus necessitating one or more additional R$_2$O or RO oxides, preferably ZnO.

A preferred embodiment of our invention is grounded in our discovery that ZnO, as an integral glass constituent, is far more effective in promoting surface crystallization of beta-quartz solid solution than previously-taught nucleating agents. In particular, such known agents as TiO$_2$ and ZrO$_2$ are unnecessary in our glasses. They may desirably be excluded to avoid imparting color to, or hardening of, the glass, or catalyzing internal nucleation.

The role of ZnO is not entirely clear. It may simply function as a nucleating agent, but microscopic studies have failed to support this explanation. Another possibility is that the ZnO undergoes some activity, chemical or physical, at the glass surface to promote nucleation. In any event, comparative studies show a dramatic enhancement of the crystallization process when ZnO is present in the glass.

We prefer a content of at least 1% ZnO in our glass to facilitate the crystallization process. Up to 10% is permissible. However, we find optimum results with 4-8%. At high Li$_2$O levels, over 8% ZnO tends to cause internal nucleation.

In general, the presence of glass components other than lithia, alumina, silica and zinc oxide is undesirable. Accordingly, the known nucleants, TiO$_2$ and ZrO$_2$, the transition metal oxides, divalent oxides other than ZnO, alkali metal oxides other than Li$_2$O and Na$_2$O, and glass formers other than silica and alumina are generally avoided. However, if required for other purposes, such other oxides may be tolerated in limited amount, the total not exceeding about 5%. In particular, we have found that up to about 2% Na$_2$O can be tolerated, and may be beneficial in glass melting. Also, a small amount of soda occurs in nature with spodumene, a desirable lithia source.

For present purposes, the nucleation and crystal growth temperature zones are within the range of 650°–850° C. . Subsequent cooling below 650° C. stops nucleation, and crystal growth occurs when the nucleated glass is reheated to the range of 650°–850° C.

It has been found that cooling of the glass must be delayed momentarily within the nucleation temperature zone to form crystal nuclei. Thus, when a glass surface is cooled rapidly (quenched) below 650° C., it contains no nuclei and will not crystallize in desired manner. To form nuclei, the glass must be cooled slowly through the nucleation zone, or held a few seconds in that zone, or reheated to a temperature in the nucleation zone.

For example, thin glass plates that are chilled through in pressing may be free of nuclei. However, pressing of a thicker glass article, where the body of the glass remains hot, will result in nucleation by reheating of the surface as the plunger is removed. Also, where a gather of glass is drawn into cane, or blown in a carbon mold, the rate of cooling, and consequently the degree of nucleation, can be varied.

We have found that when a surface is not nucleated (as by quenching), or only partially nucleated, a relatively uniform nucleation can be achieved by flash heating that surface by exposure to a temperature in the vicinity of 850° C. Further, this appears to be most effective with glasses having a high ZnO content, i.e., on the order of 8% by weight.

A particular feature of the invention is the capability of conducting the crystal growing treatment within a length of time that is commercially practical. It has been found that, while crystallization can be accomplished within 20–40 minutes, transparency is improved by heat treating for up to two hours at the lower end of the temperature range, for example, at 680° C. Such heat treatment can be carried out in a tunnel kiln or conventional annealing lehr and can incorporate the annealing step. Optionally, the article may then be rapidly chilled, in the manner of thermal tempering, to save time and further improve strength.

Ideally, ware formation will be carried out in such manner that the entire surface of the ware is subjected to the same thermal cycle, and consequently undergoes essentially uniform nucleation and crystal growth. In some cases, this ideal condition may be difficult to achieve. In others, it may simply prove prohibitively expensive.

We have found the present surface nucleation can be initiated, and/or favorably accelerated, by various surface treatments. Thus, application of a water paste was found to enhance nucleation in numerous instances. For example, coating the article surface with various water pastes formed from such oxides or hydroxides as ZnO or Mg(OH)$_2$ is especially effective in facilitating crystallization. Alkali metal halides are also effective, but tend to etch the glass surface. Vapor treatments are effective. Also, a paste produced from pulverized, crystallized glass may be employed, the crystals being beta-eucryptite.

The invention is further illustrated by reference to the attached drawing. The single figure is a triangular composition diagram wherein the apex represents 100% $SiO_2+Na_2O+Al_2O_3$, the left vertex represents 20% ZnO, and the right vertex 20% $Li_2O$, all percentages being by weight on an oxide basis. The lined area ABCD represents the effective composition range of the invention, while the smaller area EFGH represents the preferred or optimum range. The tendencies arising as one deviates from a central area of good glasses are indicated on the drawing.

DESCRIPTION OF PREFERRED EMBODIMENTS

TABLE I records a number of glass compositions, expressed in terms of moles as calculated on the oxide basis, that illustrate the present invention. TABLE IA recites those glass compositions in terms of parts by weight on the oxide basis. Inasmuch as the sum of the individual components of TABLE IA totals or closely approximates 100, for all practical purposes the values reported may be deemed to represent weight percent. The actual batch ingredients may comprise any materials, either the oxide or other compound, which, upon melting together, will be converted into the desired oxides in the proper proportions.

A glass batch, designed to produce two pounds of glass, was compounded on the basis of each composition. Each batch was ballmilled to aid in securing a homogeneous melt, and the mixture charged into a platinum crucible. The crucibles were introduced into a furnace operating at about 1650° C., the batches were melted for about 16 hours with stirring, and molten glass gobs were gathered in the crucibles to be drawn into long canes about 0.25" in diameter, or molded as rectangular slabs.

TABLE 1

|  | 1 | 2 | 3 | 4 | 5 | 6 | 7 |
|---|---|---|---|---|---|---|---|
| $SiO_2$ | 1.038 | 1.025 | 0.980 | 0.996 | 1.030 | 1.007 | 1.005 |
| $Al_2O_3$ | 0.244 | 0.257 | 0.257 | 0.253 | 0.238 | 0.255 | 0.255 |
| $Li_2O$ | 0.233 | 0.243 | 0.230 | 0.240 | 0.210 | 0.210 | 0.223 |
| $Na_2O$ | 0.015 | 0.008 | 0.010 | 0.013 | 0.025 | 0.024 | 0.024 |
| CaO | 0.038 | 0.035 | 0.048 | — | — | — | — |
| ZnO | — | — | 0.053 | 0.073 | 0.074 | 0.072 | 0.068 |
| $TiO_2$ | 0.025 | 0.025 | — | — | — | — | — |
| $Sb_2O_3$ | 0.002 | 0.002 | — | — | — | — | — |
| $B_2O_3$ | — | — | — | 0.007 | — | — | — |
| $ZrO_2$ | — | — | — | — | — | — | — |

TABLE 1A

|  | 1 | 2 | 3 | 4 | 5 | 6 | 7 |
|---|---|---|---|---|---|---|---|
| $SiO_2$ | 62.3 | 61.5 | 58.8 | 59.75 | 61.9 | 60.4 | 60.3 |
| $Al_2O_3$ | 24.9 | 26.2 | 26.2 | 25.9 | 24.3 | 26.0 | 26.0 |
| $Li_2O$ | 7.0 | 7.3 | 6.9 | 7.2 | 6.3 | 6.3 | 6.7 |
| $Na_2O$ | 0.9 | 0.5 | 0.6 | 0.8 | 1.5 | 1.5 | 1.5 |
| CaO | 2.0 | 2.0 | 2.5 | — | — | — | — |
| ZnO | — | — | 4.3 | 5.9 | 6.0 | 5.8 | 5.5 |
| $TiO_2$ | 2.0 | 2.0 | — | — | — | — | — |
| $Sb_2O_3$ | 0.5 | 0.5 | — | — | — | — | — |
| $B_2O_3$ | — | — | — | 0.5 | — | — | — |
| $ZrO_2$ | — | — | — | — | — | — | — |

TABLE II lists molar ratios of $R_2O+RO:Al_2O_3$ and of $SiO_2:Al_2O_3$ for the exemplary compositions of TABLE I, along with annealing points in °C. (A.P.), strain points in °C. (S.P.), coefficients of thermal expansion in terms of $\times 10^{-7}/°C$. (Exp.), and densities (Den.) in terms of $g/cm^3$ where measured on the glasses of TABLE I. These determinations were made utilizing techniques conventional in the glass art.

The quarter inch diameter canes were cut into five inch lengths for development and measurement of strength. The canes were heat treated in air at temperatures in the vicinity of 700° C. for times of about an hour to develop surface crystallization and thereby enhance mechanical strength.

The strengthened canes were abraded by rubbing with 30 grit silicon carbide paper. The abraded canes were then mounted in a conventional 4 point loading device, and progressively loaded to the point of breakage. The flexural strength determinations thus made were reported in terms of modulus of rupture (MOR) in units of K psi. These values are recorded in TABLE II.

TABLE II

|  | 1 | 2 | 3 | 4 | 5 | 6 | 7 |
|---|---|---|---|---|---|---|---|
| $R_2O + RO$ / $Al_2O_2$ | 1.17 | 1.11 | 1.33 | 1.29 | 1.30 | 1.20 | 1.24 |
| $SiO_2$ / $Al_2O_3$ | 4.2 | 4.0 | 3.90 | 3.93 | 4.33 | 3.95 | 3.94 |
| A.P. | 600 | — | 594 | 602 | 609 | 611 | 611 |
| S.P. | — | — | 551 | 559 | 562 | 567 | 567 |
| Exp. | 66.4 | — | 61.2 | 59.9 | 58.0 | 57.0 | 59.8 |
| MOR | 80 | 80.7 | 88.7 | 79.6 | 70.9 | — | — |
| Den. | 2.437 | 2.438 | 2.503 | 2.484 | 2.483 | 2.492 | 2.488 |

A larger size glass batch, based on a composition composed in parts by weight of 61.0 $SiO_2$, 26.2 $Al_2O_3$, 6.3 $Li_2O$, 1.0 $Na_2O$, 1.5 CaO, 4.2 ZnO and 0.5 $B_2O_3$ was formulated. This batch was mixed and melted in a gas-fired daytank capable of delivering about eight hundred pounds of usable glass. The batch was melted at about 1625° C. and the glass fed to a pneumatic press. About 150 automobile headlight lenses (90×150 mm.) were pressed. Also, about 25 discs (4" in diameter and 0.175" thick) were pressed.

Samples of both lamp lenses and discs were heat treated in accordance with a variety of temperature-time schedules to cause crystals to grow on nuclei formed during cooling of the pressed bodies. TABLE III shows the heat treatments in terms of temperature in °C. and time in minutes, and the impact strength (I.S.) of the heat treated lens.

Impact strength measures the resistance to fracture under impact of a small article such as a high velocity pebble. In this test, the sample is mounted in a holder and subjected to impact by a ¼" steel ball projected at increasing speeds until the test piece fractures. This test is currently employed to test the resistance of a headlight lens to pebbles projected by a preceding car. Currently, an acceptable lens should withstand impact at 40 miles per hour (m.p.h.) in this test.

TABLE III

| Heat treatment | | |
|---|---|---|
| Temp. | Time | I.S. (m.p.h.) |
| 0.175" plates | | |
| None | | 28 |
| 680° C. | 60 min. | 33 |
| 680° C. | 90 min. | 38, 44 |
| 690° C. | 60 min. | 42, 59 |
| 690° C. | 75 min. | 65 |
| 700° C. | 50 min. | 63, 65 (unbroken) |
| Auto Lenses | | |
| None | | 21.9 |
| 690° C. | 45 min. | 25 |
| 690° C. | 60 min. | 28 |

TABLE III-continued

| Heat treatment | | I.S. (m.p.h.) |
|---|---|---|
| Temp. | Time | |
| 690° C. | 75 min. | 40 |

Another batch was formulated on the basis of composition 5 in TABLE I. This batch was mixed and melted in the day tank at 1625° C. as previously described. Glass discs were pressed, heat treated and impact tested, also as described above. The several heat treatments applied and the recorded strength data are shown in TABLE IV as in TABLE III.

TABLE IV

| Heat treatment | | I.S. (m.p.h.) |
|---|---|---|
| Temp. | Time | |
| 680° C. | 60 min. | 23 |
| 680° C. | 75 min. | 46 |
| 680° C. | 75 min. | 45 |
| 700° C. | 50 min. | 63 (unbroken) |
| 700° C. | 60 min. | 55 |
| 700° C. | 75 min. | 64 |

The invention is further illustrated by six (6) compositions, presented in parts by weight as calculated on an oxide basis. TABLE V presents the compositions, which approximate one hundred total units, and hence provide approximate percentages by weight.

TABLE V

| | 10 | 11 | 12 | 13 | 14 | 15 | 16 |
|---|---|---|---|---|---|---|---|
| $SiO_2$ | 63.1 | 62.3 | 63.0 | 62.1 | 63.5 | 63.4 | 62.5 |
| $Al_2O_3$ | 23.5 | 23.8 | 23.8 | 23.8 | 23.6 | 23.6 | 23.8 |
| $Li_2O$ | 6.1 | 6.2 | 6.2 | 5.9 | 5.9 | 5.9 | 5.0 |
| ZnO | 5.8 | 6.0 | 5.9 | 6.4 | 5.8 | 5.9 | 8.0 |
| $Na_2O$ | 1.2 | 1.2 | 1.2 | 1.2 | 1.2 | 1.2 | 0.4 |

Two pound batches were prepared on the basis of these compositions and were melted at 1650° C. with stirring in two pound platinum crucibles. The several glasses were hand pressed into plates 2×4"×¼" and subjected to the impact test described earlier. TABLE VI lists the heat treatment given the plate tested and the impact strength observed in m.p.h. at the breaking point.

TABLE VI

| Example | Heat Treatment | | I.S. (m.p.h.) |
|---|---|---|---|
| | Temp. | Time | |
| 10 | 700° C. | 120 min. | 55½ |
| 11 | 700° C. | 60 min. | 35, 33 |
| 12 | 750° C. | 30 min. | 34, 35, 38 |
| 13 | 700° C. | 75 min. | 48 |
| 14 | 720° C. | 75 min. | 65 (unbroken) |
| 15 | 720° C. | 60 min. | 58 |
| 16 | 740° C. | 120 min. | 45 |

Yet another larger size batch, based on a composition composed in parts by weight of 62.8 $SiO_2$, 23.5 $Al_2O_3$, 5.4 $Li_2O$, 0.8 $Na_2O$, and 7.5 ZnO, was formulated, mixed together, melted at 1650° C., and automobile headlight lenses pressed therefrom which were then heated at 720° C. for two hours. The resultant lenses exhibited very high clarity and withstood impacts in the pebble test in excess of 60 miles per hour such as to render this composition the most preferred embodiment of the invention. Microscopic examination of the heat treated glass surface indicated the presence of beta-eucryptite as the sole crystal phase, the crystals being preferentially oriented with the long axis perpendicular to the glass surface. The high clarity of the heat treated glass is believed to be due to essential identity existing between the refractive index of the glass (1.522–1.524) and that of the crystals (1.524–1.526), inasmuch as the crystals exhibit diameters as great as about 125 microns.

We claim:

1. A transparent, essentially haze-free article comprising a lithium aluminosilicate glass body having its entire surface encased within and integral with a thin, compressive, semicrystalline layer containing a multiplicity of microscopic crystals of beta-eucryptite and/or beta-quartz solid solution and having a linear thermal expansion coefficient substantially lower than that of the glass body, the oxide composition of the article being substantially the same throughout and consisting essentially in percent by weight, as calculated from the batch on an oxide basis, of 55–67% $SiO_2$, 5.0–7.5% $Li_2O$, 22–28% $Al_2O_3$, 0–2% $Na_2O$, and 0–10% ZnO, the molar ratio of the $R_2O+RO$ to the $Al_2O_3$ being greater than one and the molar ratio of the $SiO_2$ to the $Al_2O_3$ being about 4.

2. An article in accordance with claim 1 wherein the $Al_2O_3$ content is 22–25%.

3. An article in accordance with claim 1 wherein the composition contains at least 1% ZnO.

4. An article in accordance with claim 3 wherein the ZnO content is 4–8%.

5. An article in accordance with claim 1 wherein the $Li_2O$ content is 5–7%.

6. An article in accordance with claim 1 wherein the molar ratio of $R_2O+RO$ to $Al_2O_3$ is greater than 1.2.

7. An article in accordance with claim 1 wherein the oxide composition consists essentially of 60–66% $SiO_2$, 22–25% $Al_2O_3$, 5–7% $Li_2O$, 4–8% ZnO, 0–2% $Na_2O$, and the molar ratio of $R_2O+RO$ to $Al_2O_3$ is greater than 1.2.

8. An article in accordance with claim 7 wherein the oxide composition consists essentially of
$SiO_2$: 62.8
$Al_2O_3$: 23.5
$Li_2O$: 5.4
$Na_2O$: 0.8
ZnO: 7.5.

* * * * *